United States Patent [19]
Niwa et al.

[11] Patent Number: 6,003,895
[45] Date of Patent: Dec. 21, 1999

[54] AIRBAG PAD WITH INSERT MOLDED ORNAMENT

[75] Inventors: Kanae Niwa, Inazawa; Tadashi Yamamoto, Nishikasugai-gun; Tadashi Yamada, Nagoya; Chisato Masuya, Gifu, all of Japan

[73] Assignee: Toyoda Gosei Co., Ltd., Aichi, Japan

[21] Appl. No.: 09/045,116

[22] Filed: Mar. 20, 1998

[30] Foreign Application Priority Data

Mar. 21, 1997 [JP] Japan .................................. 9-067751

[51] Int. Cl.⁶ .................................................. B60R 21/16
[52] U.S. Cl. .......................................... 280/728.3; 428/31
[58] Field of Search .............................. 280/731, 728.3, 280/732; 401/591, 593, 610; 428/31; 40/593

[56] References Cited

U.S. PATENT DOCUMENTS

| | | | |
|---|---|---|---|
| 4,100,010 | 7/1978 | Waugh | 156/242 |
| 5,110,647 | 5/1992 | Sawada et al. | 428/43 |
| 5,376,461 | 12/1994 | Shiraki et al. | 428/35.2 |
| 5,427,408 | 6/1995 | Ando et al. | 280/728.3 |
| 5,698,283 | 12/1997 | Yamasaki et al. | 428/43 |
| 5,839,752 | 11/1998 | Yamasaki et al. | 280/728.3 |

FOREIGN PATENT DOCUMENTS

| | | |
|---|---|---|
| 1-81351 | 5/1989 | Japan . |
| 2252268 | 8/1992 | United Kingdom . |

*Primary Examiner*—Paul N. Dickson
*Attorney, Agent, or Firm*—Pillsbury Madison & Sutro Intellectual Property Group

[57] ABSTRACT

An air bag pad in which an ornament is disposed on a front surface of a synthetic resin pad body covers a folded air bag. The ornament is shaped like a sheet having a bonding layer provided in its rear surface so as to be capable of being bonded to the pad body easily. The ornament is used as an insert so that the pad body is insert-molded. The bonding layer is bonded to the pad body when the pad body is molded.

6 Claims, 4 Drawing Sheets

AIRBAG PAD WITH INSERT MOLDED ORNAMENT

BACKGROUND OF THE INVENTION

1. Field of the Invention

The present invention relates to a synthetic resin air bag pad in which an ornament is disposed on a front surface of a synthetic resin pad body so as to cover a folded air bag. This invention also relates to a method of producing such an air bag pad.

2. Description of the Related Art

As a conventional air bag pad, there is known an air bag pad in which an ornament provided separately from a pad body is attached to the pad body in order to make the design of the external appearance good. The ornament is provided because the relief-like uneven surface of the pad body is not aesthetically attractive (see Japanese Utility Model Publication No. Hei. 1-81351).

The air bag pad is, however, used in such a manner that during inflation of a folded air bag a predetermined position of the pad is ruptured to permit the inflating air bag to protrude through the pad. The ornament is attached to the pad body while a sufficient attachment strength is secured by suturing means with elastic thread, rivetting means, means for bending a pin protruded from the ornament after passing the pin through the pad body, or the like, so that the ornament does not scatter when the air bag is inflated.

Accordingly, much labor is required for attaching the ornament to the pad body because the ornament is provided separately from the pad body. Thus, drawbacks of conventional air bag pads include the large number of steps and high cost required for producing the air bag pad, as well as the heavy weight of the pad.

SUMMARY OF THE INVENTION

The present invention is designed to solve the aforementioned problems and an object thereof is to provide an air bag pad which can be produced easily while a high decorating effect is secured without increasing the weight of the air bag pad.

According to the present invention, there is provided an air bag pad for covering a folded air bag. The air bag comprises a synthetic resin pad body; and an ornament disposed on a front surface of the pad body. The ornament is shaped like a sheet and has a bonding layer in a rear surface thereof so as to be bonded to the pad body easily when the pad body is molded, whereby the pad body is insert-molded with the ornament as an insert.

The air bag pad is preferably formed of an olefin or styrene thermoplastic elastomer and the bonding layer is formed of an olefin resin sheet material.

Preferably, the air bag pad further includes a potting layer having a positive meniscus and being formed in a front surface of the ornament.

More preferably, the potting layer is formed of a synthetic resin material having an expansion of not smaller than 100%.

Further, both of the pad body and the bonding layer may be made of nonpolar materials.

Still further, according to the present invention, there is provided method for producing an air bag pad comprising the steps of; setting a sheet-like ornament having a bonding layer in a rear surface thereof in a mold; and injecting a molding material perpendicularly to a rear surface of the bonding layer so as to insert-mold a pad body with the ornament as an insert, thereby producing the air bag pad.

In the above-described method for producing an air bag pad, the mold set preferably has a gate for injecting the molding material. The gate is preferably disposed in a position perpendicularly opposite to a rear surface of the ornament in order to inject the molding material perpendicularly to the rear surface of the bonding layer.

More preferably, the gate is disposed substantially opposite to a center of the ornament.

In an air bag pad according to the present invention, an ornament is shaped like a sheet having a bonding layer which is provided in its rear surface and bonded to a pad body easily when the pad body is molded. Further, the ornament is used as an insert so that the pad body is insert-molded.

That is, an ornament provided separately from the pad body is bonded to the pad body not by using suturing means with elastic thread, rivetting means, means for bending a pin protruded from the ornament, or the like, but by using the bonding layer with a simple process of setting the ornament as an insert in a mold set for the pad body to thereby insert-mold the pad body. Accordingly, the ornament can be attached to the pad body easily without increasing its weight. Of course, because the ornament provided separately from the pad body is attached to the pad body, a high decorating effect of the pad can be obtained.

Accordingly, the air bag pad according to the present invention can be produced easily while a high decorating effect is secured without increasing the weight of the pad.

Further, if the pad body is formed of an olefin or styrene thermoplastic elastomer and the bonding layer of the ornament is formed of an olefin resin sheet material, the ornament can be bonded to the pad body easily by heat fusion without using any adhesive agent at the time of molding the pad body, because the two materials are nonpoler materials having good properties of adhesion to each other. Examples of the olefin resin include polyethylene, polypropylene, etc. In the case of polypropylene, it may be used in the form of homopolymer or block copolymer.

Further, if a potting layer of a positive meniscus is formed in the front surface or the ornament, a higher decorating effect can be given to the pad.

In this case if the ornament has a film-like ornament body provided with a bonding layer and a potting layer in its rear and front surfaces of the ornament body respectively, and the potting layer is formed of a synthetic resin material having an expansion of not smaller than 100%, the ornament body is expanded easily because the ornament body is shaped like a thin film and the ornament per se follows the expansion of the pad body easily because the potting layer has a sufficient expansion. Accordingly, there is no risk of prevention of the smooth rupture of the pad. If the potting layer undesirably has an expansion smaller than 100%, the ornament cannot follow the pad body because the potting layer cannot be expanded sufficiently.

If the mold set for the pad body is configured so that the gate for injecting the molding material of the pad body is disposed in a position perpendicularly opposite to the rear surface of the ornament to be set, the molding material can press the ornament to prevent the ornament from being displaced when the molding material of the pad body is injected into the cavity through the gate at the time of molding the pad body. Accordingly, it is not necessary to prepare any special jig, or the like, for setting the sheet-like ornament. Accordingly, the mold set for the pad body can be simplified in structure, so that not only the cost of the mold set can be reduced but also fewer defective products are produced. This fact can contribute to the reduction of the production cost of the pad.

DETAILED DESCRIPTION OF THE PREFERRED EMBODIMENTS

Embodiments for carrying out the present invention will be described below with reference to the drawings.

Figure 1:
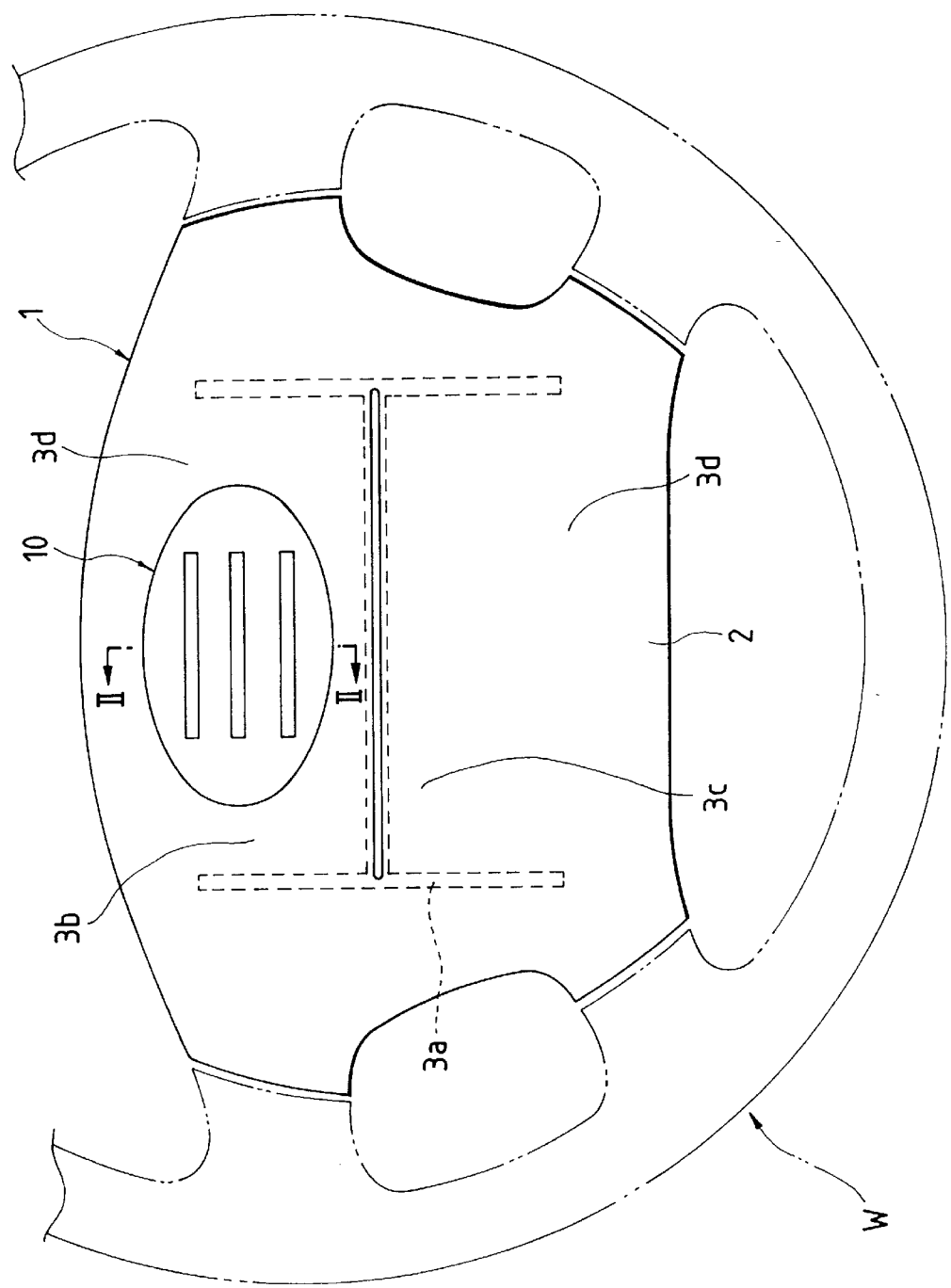
FIG. 1 is a plan view of pad of a first embodiment of the present invention.

As shown in FIG. 1, an air bag pad 1 according to a first embodiment for carrying out the invention is designed to be arranged on the upper surface of the center of a steering wheel W for a vehicle. Further, an ornament 10 is disposed in the front side of the upper surface of the pad 1. Further, the pad 1 comprises a pad body 2, and the ornament 10.

Figure 2:
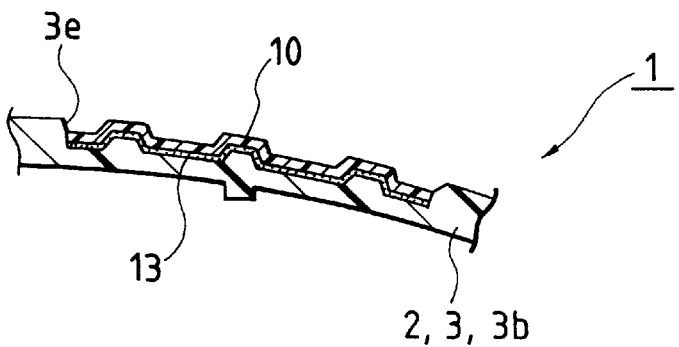
FIG. 2 is a partly sectional view of the first embodiment taken along the line II—II in FIG. 1.

The pad body 2 is formed of an olefin thermoplastic elastomer. As shown in FIGS. 1, 2 and 5B, the pad body 2 includes a ceiling portion 3 formed to cover a folded air bag not shown, and a side wall portion 4 extended downward from the lower surface of the ceiling portion 3 so as to be substantially shaped like a rectangular pipe. The ceiling portion 3 has a presumptive rupture portion 3a which is so thin that the presumptive rupture portion 3a can be ruptured easily when the air bag is inflated. As shown in FIG. 1, the presumptive rupture portion 3a is H-shaped when viewed from above so that a front door portion 3b and a rear door portion 3c are opened with the front and rear edge sides of the ceiling portion 3 as hinges 3d respectively when the presumptive rupture portion 3a is ruptured. The side wall portion 4 serves as a portion for holding the pad 1 in a bag holder of an air bag apparatus not shown.

The air bag apparatus comprises an air bag received while folded, a pad 1 for covering the folded air bag, an inflator for supplying an inflation gas to the folded air bag, and an air bag holder for holding the air bag, the pad 1 and the inflator. The bag holder is used so that the air bag apparatus is disposed on the upper portion of the center of the steering wheel 1.

Figure 3:
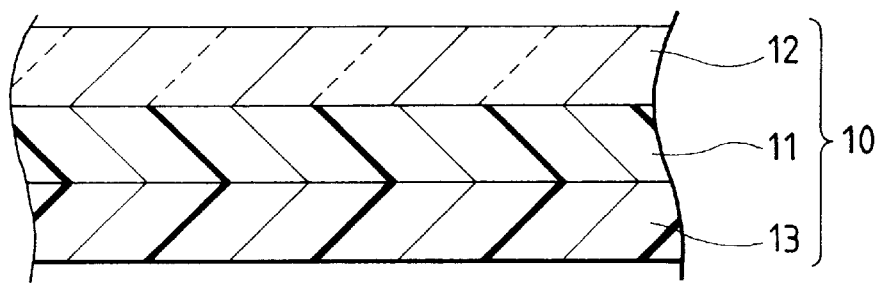
FIG. 3 is an enlarged sectional view of an ornament of the first embodiment.

The ornament 10 is disposed in a recess portion 3e provided in the upper surface of the front door portion 3b in the front side of the pad 1. In the case of this embodiment, as shown in FIGS. 2 and 3, a decorative layer 11 of a vinyl chloride film having metallic-luster provided in its front surface formed of chromium, aluminum, or the like, a protective layer 12 of a transparent acrylic film disposed on the front surface of the decorative layer 11 and a bonding layer 13 of a polypropylene film disposed on the whole rear surface of the decorative layer 11 are laminated to form a three-layer structure. The three-layer structure is shaped like a film having a thickness of 0.25 mm.

Figure 5A:
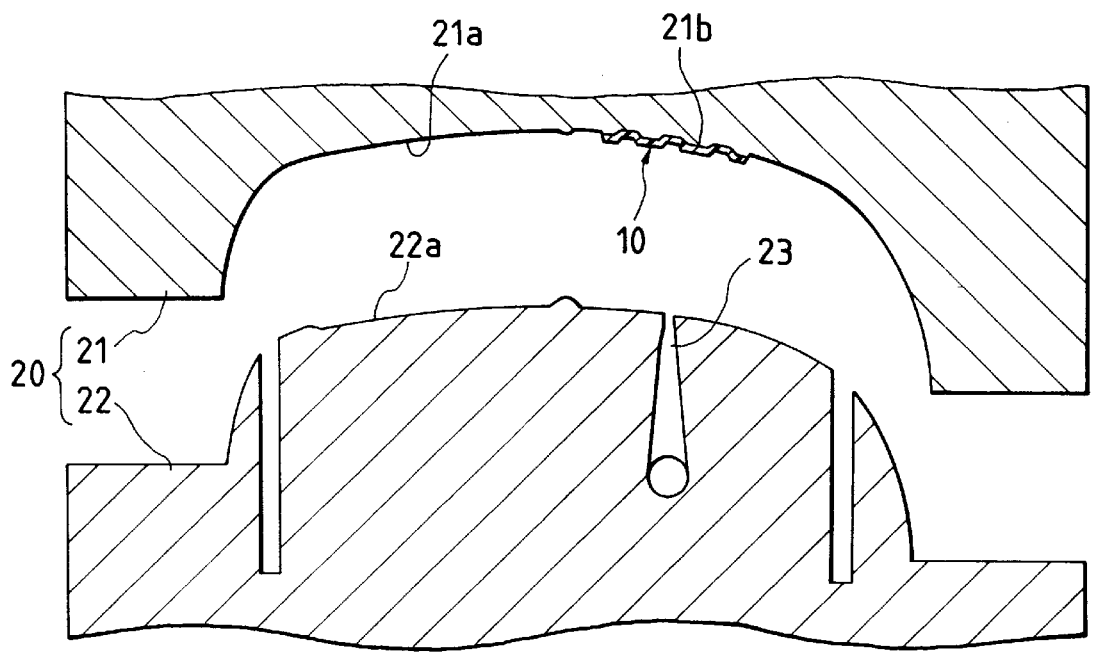
FIGS. 5A and 5B are sectional views of a mold set showing the state of molding the pad according to the first embodiment.
Figure 5B:
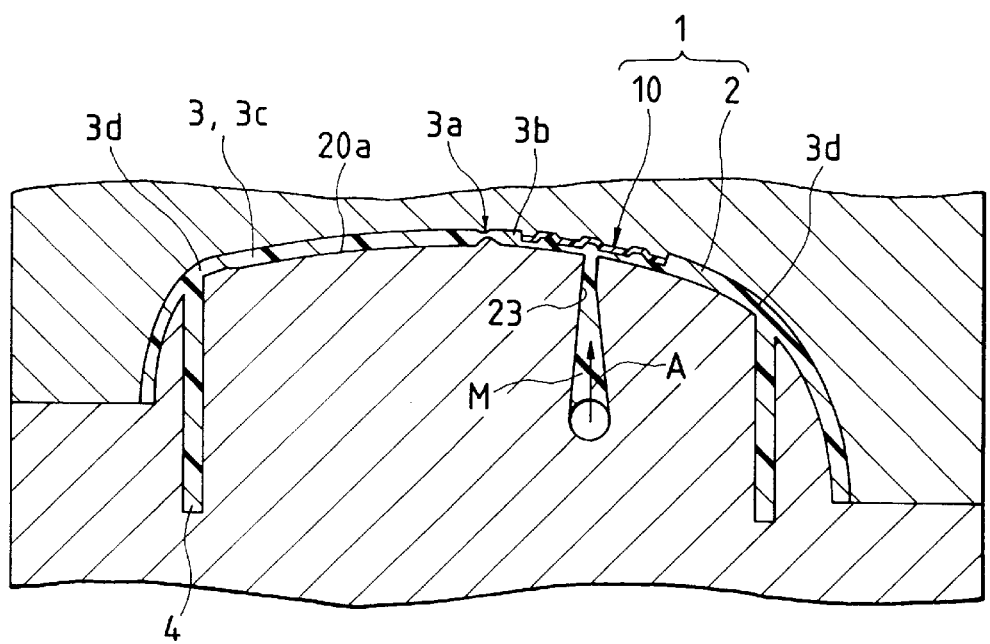

As shown in FIG. 5A, a mold set 20 used for the production of the pad 1 according to the first embodiment has two split molds 21 and 22. The split mold 21 has a mold surface 21a which is formed so that the front surface of the pad 1 can be molded, and a setting portion 21b which is provided with an uneven surface to which the ornament 10 can be fitted and set. The split mold 22 has a mold surface 22a which its formed so that the rear surface of the pad 1 can be molded and a gate 23 for injecting a molding material M of the pad 1 into a cavity 20a formed at the time of mold closing. The gate 23 is provided in the split mold 22 so as to be perpendicularly opposite to the ornament 10 at the center of the rear surface of the ornament 10 set in the setting portion 21b so that the molding material M can be applied perpendicularly to the ornament 10 at the time of molding.

The production of the pad 1 by using the mold set 20 will be described. First, the ornament 10 is produced. The ornament 10 is produced by using vacuum molding in which smooth ornament materials having a protective layer 12, a decorative layer 11 and a bonding layer 13 are heated so as to be softened and then evacuated to form a predetermined shape.

Then the ornament 10 having a predetermined shape obtained by trimming after the vacuum molding is set in the setting portion 21b of the split mold 21 at the time of mold opening as shown in FIG. 5A.

Then, if molding closing is performed and the molding material M is injected into tho cavity 20a through the gate 23 as shown in FIG. 5B (arrow A), the pad 1 can be molded.

Then, if the mold set 20 is opened for mold releasing and an after-process such as removal of burr, or the like, is performed, the pad 1 can be obtained.

The thus produced pad 1 according to the first embodiment is designed so that the ornament 10 is bonded to the pad body 2 not by using suturing means with elastic thread, rivetting means, means for bending a pin protruded from the ornament, or the like, but by simple means of insert-molding the pad body 2 with the ornament 10 as an insert. Accordingly, the ornament 10 can be attached to the pad body 2 easily without increasing its weight. Of course, because the ornament 10 provided separately from the pad body 2 is attached to the pad body 2, a higher decorating effect than that in a pad decorated with a relief-like uneven surface can be secured.

Accordingly, the air bag pad 1 in the first embodiment can be produced easily while a high decorating effect is secured without increasing the weight of the pad.

Further, in this embodiment, the pad body 2 is formed of an olefin thermoplastic elastomer, the bonding layer 13 of the ornament 10 is formed of a polypropylene sheet material (shaped like a thin film in this embodiment), and the two materials are nonpolar materials having good properties of adhesion to each other. Accordingly, the ornament 10 can ba bonded to the pad body 2 easily by heat fusion without using any adhesive agent when the pad body 2 is molded. This fact can contribute to the facilitation of the production of the pad 1. When the bonding layer 13 is shaped like a sheet and formed of olefin resin such as polypropylene, polyethylene, or the like, the ornament 10 can be effectively bonded to the pad body 2 by using heat fusion at the time of molding without using any adhesive agent. This technique can be used in the case where the pad body 2 is formed of olefin thermoplastic elastomer, and also in the case where the pad body is formed of styrene thermoplastic elastomer.

Figure 4:
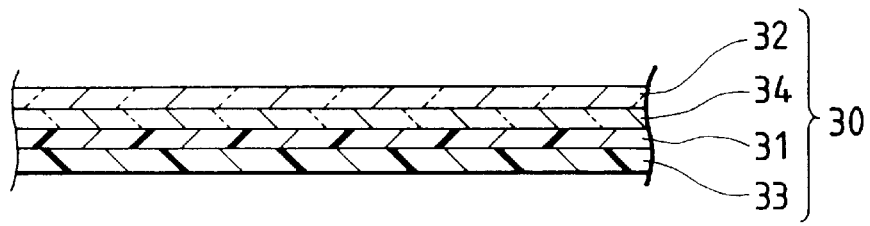
FIG. 4 is an enlarged sectional view of an ornament of a second embodiment.

The film-like ornament, is not limited to the ornament in this embodiment rather, an ornament 30 having a decorative layer 31 formed by aluminum vapor deposition as shown in FIG. 4 may be used as a second embodiment. The thickness of this ornament 30 in selected to be 0.13 mm. This ornament 30 has a protective layer 32 of an acrylic film disposed in its front surface, and a bonding layer 33 of a polypropylene film disposed in its rear surface. The reference numeral 34 designates an adhesive agent layer for making the protective layer 32 adhere to the decorative layer 31. If the ornament 30 having a predetermined shape obtained by vacuum molding is set in the mold set 20 shown in FIG. 5A and tho pad body is insect-molded, a pad having the same operation and effect as that in the pad 1 in the first embodiment can be produced.

In the case where the mold set 20 having the gate 23 formed in a position perpendicularly opposite to the set ornament 10 is used as in tho method of producing the pad 1 in the first embodiment, the molding material M can press the ornament 10 to prevent the ornament 10 from being displaced when the molding material M of the pad body 2 is injected into the cavity 20a through the gate 23 at the time of molding the pad body 2. Accordingly, it is not necessary to prepare any special jig, or the like, for setting the sheet-like ornament 10. Accordingly, the mold set 20 for the pad body 2 can be simplified in structure, so that not only the cost of the mold set can be reduced but also fewer detective products are produced. This fact can contribute to the reduction of the production cost of the pad 1.

Although it is preferable to dispose the gate 23 to face the center of the ornament 10 so that the molding material M can be applied to the center of the roar surface of the set ornament 10, the gate 23 may be disposed in a position displaced from the center of the ornament 10 so long as the ornament 10 can be pressed by the molding material M.

Figure 6:
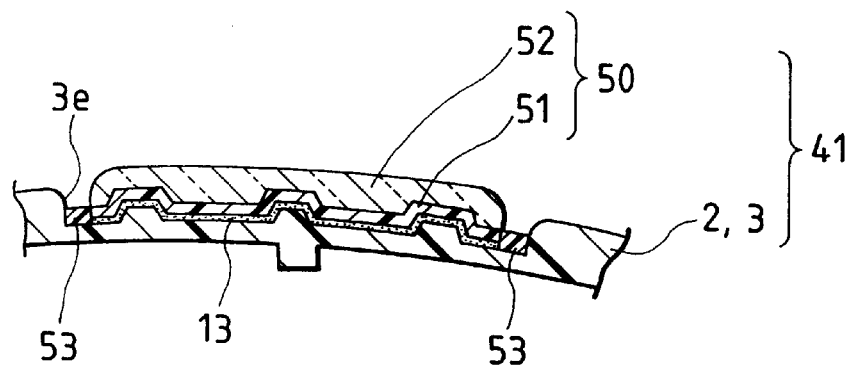
FIG. 6 is a sectional view of a pad of a third embodiment of the present invention.

If a transparent potting layer 52 of a positive meniscus is formed in the front surface of an ornament 50 of a pad 41 in a third embodiment for carrying out the present invention as shown in FIG. 6, a higher decorating effect can be given to the pad 41.

This ornament 50 has an ornament body 51 provided with a bonding layer 13 of a polypropylene film in its rear surface in the same manner as in the ornament 10 of the pad 1, and a potting layer 52. The potting layer 52 is formed of transparent urethane. The pad 41 can be produced as follows. The ornament body 51 is set as an insert in the mold set 20 and the pad body 2 is insert-molded. When the potting layer 52 is then formed on the upper surface of the ornament body 51 by casting after mold releasing, the pad 41 can be produced. A coating agent 53 for shedding a casting material is preferably applied in advance onto the recess portion 3e in the circumference of the ornament body 51 at the time of casting so that a lens effect can be secured without occurrence of sagging in the circumferential edge of the potting layer 52.

A synthetic resin material having an elongation (also referred to herein as expansion) of not smaller than 100% (according to JIS-K-6301) is used as the casting material of the putting layer 52.

In the pad 41 using such an ornament 50, when the presumptive rupture portion 3a provided in the pad body 2 of the pad 41 is ruptured by inflation of the air bag, not only the ornament body 51 is expanded easily because the ornament body 51 is shaped like a thin film but also the ornament 50 per se can follow the expansion of the pad body 2 because the potting layer 52 has a sufficient expansion. Accordingly, there is no risk of prevention of the smooth rupture of the pad 41. The thickness of the film-like ornament body 51 is preferably selected to be not larger than 0.5 mm so that the film-like ornament body 51 is expanded easily when the pad 41 is ruptured. Some material which is other than the ornament 10 and which is the same as the ornament 30 may be used as the ornament body 51.

Further, the bonding layer is not required to be disposed on the whole rear surface of the ornament so long as the bonding force of the bonding layer to the pad body 2 can be secured. Further, the bonding layer may be formed like an ornament 70 according to a fourth embodiment as shown in FIG. 7 or like an ornament 90 according to a fifth embodiment as shown in FIG. 8.

Figure 7:
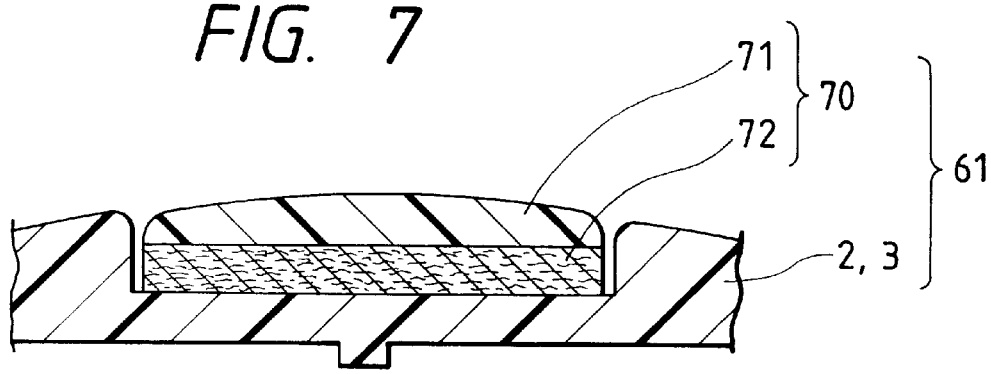
FIG. 7 is a sectional view of a pad of a fourth embodiment of the present invention.

The ornament 70 shown in FIG. 7 is shaped like a sheet which is formed so that a bonding layer 72 which is a fablic of carbon fiber is bonded to the whole rear surface of a front layer 71 having a design effect. When this ornament 70 is set in a predetermined mold set and molded at the time of molding the pad body 2, the molding material enters the bonding layer 72 to wrap the carbon fiber of the bonding layer 72. Consequently, the pad body 2 and the bonding layer 72 are bonded to each other.

Also, in the pad 61 having the ornament 70 disposed according to a fourth embodiment for carrying out the present invention, the ornament 70 is used as an insert, the pad body 2 is insert-molded, and the bonding layer 72 is bonded to the pad body 2 so as to adhere to the pad body 2. Accordingly, the ornament 70 can be attached to the pad body 2 easily without increasing its weight. Further, because the ornament 70 provided separately from the pad body 2 is attached to the pad body 2, a higher decorating effect than that in a pad decorated with a relief-like uneven surface can be secured.

Figure 8:
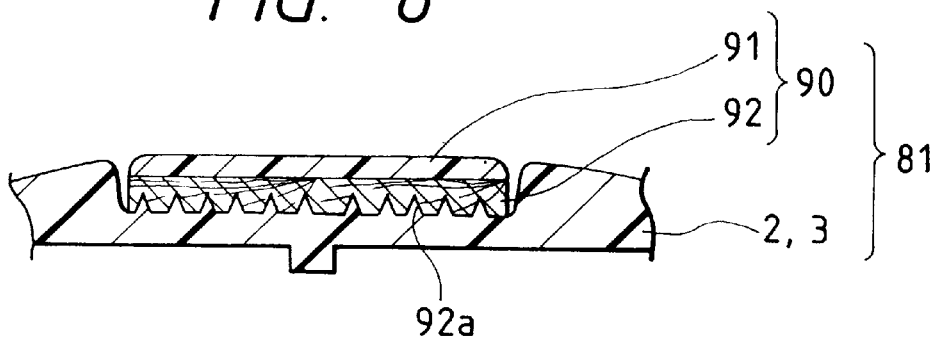
FIG. 8 is a sectional view of a pad of a fifth embodiment of the present invention.

The ornament 90 shown in FIG. 8 is shaped like a sheet which is formed so that a bonding layer 92 made of a wood material having a large number of recess portions 92a is bonded to the whole rear surface of a front layer 91 having a design effect. When this ornament 90 is set in a predetermined mold set and molded at the time of molding the pad body 2, the molding material enters the recess portions 92a of the bonding layer 92 in the form of anchors. Consequently, the pad body 2 and the bonding layer 92 are bonded to each other.

Also in the pad 81 having the ornament 90 disposed according to a fifth embodiment for carrying out the present invention, the ornament 90 is used as an insert, the pad body 2 is insert-molded, and the bonding layer 92 is bonded to the pad body 2 so as to adhere to the pad body 2. Accordingly, the ornament 90 can be attached to the pad body 2 easily without increasing its weight. Further, because the ornament 90 provided separately from the pad body 2 is attached to the pad body 2, a higher decorating effect than that in a pad decorated with a relief-like uneven surface can be secured.

Although the first to fifth embodiments have shown the case where a pad 1, 41, 61 or 81 is used in an air bag apparatus disposed in a steering wheel, the present invention may be applied to the case where a pad is disposed in any other assistant driver's seat air bag apparatus, or the like, so as to cover a folded air bag.

What is claimed is:

1. An air bag pad mountable to a vehicle to both form a part of an interior of the vehicle and cover a folded air bag, said air bag pad comprising:

a synthetic resin pad body having a front surface, a portion of which is exposed to the vehicle interior when said air bag pad is mounted to the vehicle;

an ornamental film insert having front and rear surfaces which are integrally formed and made of the same resin;

a bonding layer insert molding said rear surface of said ornamental film insert to said front surface of said pad body; and a potting layer formed on said front surface of said ornamental film insert, said potting layer comprising a synthetic resin material having an elongation of not smaller than 100%, wherein said pad body is insert-molded with said ornamental film insert.

2. The air bag pad according to claim 1, wherein said pad body is formed of an olefin thermoplastic elastomer and said bonding layer is formed of an olefin resin sheet material.

3. The air bag pad according to claim 1, wherein said pad body is formed of an styrene thermoplastic elastomer and said bonding layer is formed of an olefin resin sheet material.

4. The air bag pad according to claim 1, wherein said potting layer has a positive meniscus.

5. The air bag pad according to claim 1, wherein both of said pad body and said bonding layer are made of nonpolar materials.

6. The air bag according to claim 1, wherein said potting layer is made of a transparent urethane.

* * * * *